United States Patent [19]

Bridgeford

[11] Patent Number: 4,592,795
[45] Date of Patent: Jun. 3, 1986

[54] NON-EDIBLE, REINFORCED AMYLOSE AND AMYLOSE STARCH FOOD CASINGS

[75] Inventor: Douglas J. Bridgeford, Champaign, Ill.

[73] Assignee: Inc. Teepak, Oak Brook, Ill.

[21] Appl. No.: 675,092

[22] Filed: Nov. 26, 1984

[51] Int. Cl.$^4$ .............................................. B44D 1/52
[52] U.S. Cl. ........................................ 156/203; 138/118.1; 426/105; 427/301; 427/364; 427/394; 427/414; 428/532; 428/533; 428/36
[58] Field of Search ................. 156/203; 426/105; 427/301, 303, 364, 394, 402, 414; 428/508, 510, 532, 533, 36

[56] References Cited

U.S. PATENT DOCUMENTS

| | | |
|---|---|---|
| 2,729,565 | 1/1956 | O'Brian .................................. 99/176 |
| 3,312,560 | 4/1967 | Walton .................................. 106/213 |
| 3,318,715 | 5/1967 | Tetenbaum ........................... 106/210 |
| 3,350,221 | 10/1967 | Taylor .................................. 117/140 |
| 4,226,264 | 10/1980 | Bridgeford ........................ 138/118.1 |

*Primary Examiner*—David Simmons
*Attorney, Agent, or Firm*—Howard M. Ellis; Michael L. Dunn

[57] ABSTRACT

Amylose and high amylose starch fibrous food wrappings, including casings for meat products provide a low cost alternative to ordinary fibrous casings. The composite material consists of a cross-linked matrix of the amylose polymer coupled or bonded with the reinforcement and possesses a wet strength and elongation properties for suitable handling and stuffing without exhibiting embrittlement upon aging.

40 Claims, No Drawings

NON-EDIBLE, REINFORCED AMYLOSE AND AMYLOSE STARCH FOOD CASINGS

BACKGROUND OF THE INVENTION

The present invention relates to food wrappings, and more particularly, to non-edible casings for meat and sausage products. They are formed of a fibrous reinforcement impregnated with a continuous cross-linked matrix of an amylose-containing material to provide a composite type wrapping characterized by high wet strength with little or virtually no age embrittlement, and therefore, are especially useful for stuffing larger size meat products, such as braunschweiger, bologna, salami, hams and the like.

Amylose polymers have been used heretofore in food wrapping applications. However, use of amylose in food casings has been restricted to non-reinforced edible types having very low wet strengths, as for example, those used in packaging fresh link sausages where tenderness of the film is considered a desirable property to impart appropriate bite to the casing which is ingested with the meat product. Many of these fragile, edible type amylose casings are prestuck or perforated with holes to provide for egress of fats and oils from the meat when cooked by the consumer. One such example is described in U.S. Pat. No. 4,226,264 where high elasticity is imparted to edible sausage casings by a helical pattern of cross-linked amylose units assuring encased meat products with tightly drawn casings even with shrinkage of the meat as a result of the cooking process. In spite of their favorable properties however, prior art unreinforced amylose casings, such as those of U.S. Pat. No. 4,226,264 have wet strengths resistant to break forces typically well below 1000 psi, and therefore, lack the strength and toughness needed for stuffing larger, heavier meat products like hams, bolognas, etc.

Other digestible starch and amylose casings are described in U.S. Pat. No. 2,729,565 where frankfurters are prepared in casings formed from substantially pure amylose, or alternatively, a major proportion of amylose and a minor proportion of amylopectin. Although U.S. Pat. No. 2,729,565 suggests molecular orientation of the film for increased strength, the casings nevertheless, lack the required wet strength and toughness for stuffing large size meat products. Accordingly, the present invention relates to novel reinforced amylose and high amylose content starch food wrappings, including casings having sufficient wet strength and toughness to resist the break force normally associated with packaging large size meat products.

As previously indicated, amylose-containing polymers have had only limited application as food casings, mainly because of exceedingly low wet strengths. But in addition, amylose was not widely used as a result of its glass-like brittleness and poor elongation properties, particularly with the evaporation of moisture from the film. Even at 50 percent relative humidity amylose films have a low percent elongation and can become brittle as to render them, as a practical matter, useless as food casings. As a result, food grade polyols, like glycerin, customarily used to plasticize brittle polymers, such as in cellulose casings, have been suggested for plasticizing amylose films. However, U.S. Pat. Nos. 3,312,560 and 3,318,715 which teach amylose films laminated or coated to cellulose bases, e.g. cellophane, paper, to impart special properties thereto confirm that at low relative humidities prior art amylose films plasticized with glycerin have about the same elastic modulus and percent elongation as unplasticized amylose films. In fact, nonreinforced, non-cross-linked amylose films become embrittled usually within three to five weeks even when plasticized with glycerin.

Accordingly, a further aspect of the present invention lies in the discovery that aging embrittlement of plasticized amylose films and casings can be minimized or virtually eliminated by fibrous reinforcement and through cross-linking. Unexpectedly, it was found that fibrous reinforced, cross-linked amylomaceous composite casings of the present invention plasticized with food grade polyols, such as glycerin, do not undergo embrittlement with age. This provides important advantages, including storageability of the wrappings and casings before use without consequential losses in wet strength and elongation at break.

A high percentage of the non-edible cellulose type food casings widely used are manufactured by the well-known viscose process. The process typically provides for chemically regenerating a web saturated with sodium cellulose xanthate, including by-products of xanthation dissolved in caustic soda. In the process of regenerating the cellulose, carbon disulfide and hydrogen sulfide are produced as by-products. As a result, cellulose casings must be manufactured under stringent standards to protect the health of workers in production areas from exposure to unsafe levels of these potentially harmful byproducts. Similarly, plant effluents must be treated, for example, with scrubbers before being discharged into the environment. Accordingly, the present invention provides a practical alternative for the widely used fibrous reinforced cellulose type casings which not only offers a more economical alternative in terms of raw materials and production costs, but also a product that can be manufactured by a novel method which causes fewer environmental problems.

SUMMARY OF THE INVENTION

The present invention relates to non-edible, high wet strength amylose and high amylose content starch food wrappings, and more particularly, to fibrous reinforced amylose casings for meat and sausage products, such as chubs and sticks like bologna, salami, braunschweiger, deli loaves, as well as hams and wherever strong, tear resistant food wrappings are indicated. The casings of the present invention may be either plasticized, e.g. glycerin, dried and shirred into convenient tubular strands, or alternatively, supplied as premoisturized, ready-to-stuff flat reelstock containing at least about 20 percent, and more specifically, from about 20 to 40 percent moisture content based on total casing weight which are packaged for storage, shipment, and use by food processors without prior soaking. They are prepared from a fibrous web impregnated with a continuous cross-linked matrix formed from an amylose-containing amylomaceous material.

The degree of cross-linking should be sufficient to impart high wet strength to the composite while minimizing embrittlement. That is, the wet strength of the casings should be enhanced through the curing mechanism, but without imposing excessive trade-offs in flexibility properties.

Generally, the amylomaceous materials include, for example, whole, nonfractionated starches, preferably those having high amylose levels; amylose recovered from starch separation processes, as well as miscellaneous starches preferably containing at least about 45 percent amylose, such as amylomaize and other high amylose starches. The amylomaize starches are especially adaptable for use in the present invention by providing low cost, continuous film forming polymers.

The addition of catalyzed or non-catalyzed cross-linking agents to concentrated polymeric dopes has been found to often result in undesirable drifts in dope rheological behavior making effective penetration of the reinforcement difficult as the material gels. The present invention, however, also provides for novel manufacturing methods whereby the reinforcement is saturated with high temperature amylose-containing dopes having high solids content without undesirable variations in dope viscosity. One method of the present invention contemplated for accomplishing this objective, is to apply the cross-linking agent to the reinforcement substrate, if necessary, with catalyst before the amylose dope is applied. The concentrated polymeric dope, with or without added catalyst, is then applied to the dried reinforcement by conventional means whereby the cross-linking agent becomes metered in-situ from the reinforcement into the hot dope. The saturated web is cured without excessive cross-linking and little or no age embrittlement. This method not only avoids the gelling problem, but also has the added advantage of eliminating or reducing environmental problems normally associated with chemical regeneration methods of manufacturing food casings.

PREFERRED EMBODIMENTS OF THE INVENTION

The present invention relates to non-edible, reinforced food wrappings, such as sausage and meat casings comprising a fibrous reinforcement saturated with a continuous cross-linked matrix, preferably of a high amylose-containing amylomaceous material. The casings are not only characterized by high wet strength, but also good elastic moduli to resist break forces normally experienced during stuffing operations. Surprisingly, cross-linking of the polymeric matrix and the fibers of the reinforcement, to a limited extent, imparts the desired high wet strength to the composite while avoiding loss in flexibility, especially when plasticized. Generally, the density of the cross-linking and concomitant enhancement in wet strength of the cured composite is that which is sufficient to resist a break force of not less than 1200 psi, and more particularly, from about 2000 to about 4000 psi. The density of cross-linking, however, should not be so great as to increase embrittlement of the casing and thereby impart an unacceptably high modulus of elasticity. A high wet strength accompanied by brittleness would effectively render the tubular casings useless as food wrappings. Therefore, cross-linking of the composite should be balanced to impart high wet strength to the casing while minimizing embrittlement.

The fibrous reinforcement is impregnated with an amylomaceous dope saturating the web between the fibers forming a continuous coated composite. The polymer loading of the composite to the reinforcement may be in the range of about 1:1 to about 3:1 dry weight of polymer relative to the weight of reinforcing fibers, and should not be confused with the amylose starch filter sheets, such as disclosed in U.S. Pat. No. 3,350,221. There, fibrous fleece or batts are bonded with a binding agent consisting of a cross-linked high amylose starch to avoid loss of binding capacity of the fleece when the filter is wet. U.S. Pat. No. 3,350,221 is not concerned with the problem of embrittlement associated with food wrappings, but in addition, the final coated prior art fleece would have a discontinuous coating to impart the requisite porosity to perform as filter media. In this regard, the cross-linked amylose matrices as disclosed herein according to the present invention are—continuous—which for purposes of this invention is intended to mean a substantially nonporous network of polymer bound fibers, which network would be unsuitable where porous materials are indicated.

The expression "amylose-containing amylomaceous material" as used herein is intended to include ordinary commercially available grades of starches containing both amylose and amylopectin fractions. Such starches, however, may contain relatively low concentrations of amylose, e.g. $<30$ percent. "High amylose-containing amylomaceous material" encompasses both fractionated and nonfractionated starches containing higher amylose levels of at least about 45 percent, and more specifically, from about 55 to about 95 percent. In other words, this would include fractionated products containing substantially pure amylose, as well as nonfractionated high amylose starches or mixtures thereof, for example, containing from about 60 percent to about 85 percent amylose and from about 15 percent to about 40 percent amylopectin fraction. One particularly desirable high amylose starch is amylomaize. Amylomaize is an economical, commercial available food grade film forming polymer. Amylomaize VII, for example, is a starch mutant containing about 70 percent amylose and about 30 percent amylopectin. Other similar commercially available starches are marketed under such trademarks as "Superlose".

Generally, the fibrous reinforcement for the casings is prepared from fibers approved for use in food wrapping applications. Although not limited to, they include for instance, any cellulosic material, and particularly, high strength fibers, as for example, Philippine hemp fibers, cotton fibers, wood fibers, and their derivatives. One embodiment provides for a reinforcement in the form of a fibrous naturally occurring cellulosic material impregnated in slurry form, but more preferably in the form of a web. That is to say, one embodiment involves food wrappings prepared with webs or sheets of woven, but preferably nonwoven fibers which includes various types of paper and paper products. However, the reinforcement of choice is the most economic fibrous web which will impart the needed strength and other characteristics which are consistent with the properties of the casings described herein. Therefore, other desirable reinforcements may be prepared in addition to those mentioned above. They include mixtures of Philippine hemp fibers with long fibered soft wood fibers, or mixtures of soft wood fibers with rayon paper making fibers or textile rayon type fibers, etc. Synthetic webs prepared from woven, nonwoven, and even spun fibers like polyesters, such as available under the Dupont trademark "Reemay"; or the various polyamides, like nylon 6; nylon 6,6, etc., may also be employed. In each case, the fibrous reinforcement should have sufficient matrix adherence properties and wet strength to be directed through the polymer saturating and drying stations.

The binder for the reinforcement may be a cellulose type derived from either viscose or decausticized viscose and thermally regenerated in the web. Alternatively, the web may be bonded with conventional saturating web binders, such as polyamides, cross-linked polyvinyl alcohols, and many other conventional type binders. However, it is preferable that the binder loading be kept to a minimum because otherwise it may "blind" the web so that saturation with the polymeric dope is incomplete.

The reinforcement is saturated preferably with an aqueous polymeric dope containing the high amylose-containing amylomaceous material. Preferably, a high amylose starch like amylomaize or amylose, is first slurried in super heated water at a temperature ranging from about 100° to about 160° C. Generally, the hot aqueous dispersion of the polymeric dope will contain from about 5 to about 60 percent solids, and more specifically, from about 10 to about 30 percent solids. The hot concentrated dope, which preferably includes plasticizer, such as glycerin, polyvinyl alcohol and other food acceptable grades of polyvalent alcohol, is then applied to the reinforcement by conventional methods known in the art and dried without further steps. However, because of the high solids content and rapid gellation characteristics of the dope the required cross-linking agent and agent for catalyzing cross-linking, i.e. curing catalyst, may not be incorporated into the dope without avoiding rapid changes in viscosity. Accordingly, it was discovered that the dope instability problem can be controlled by incorporating the cross-linking agent and/or curing catalyst into the fibrous reinforcement before saturating the web with the polymeric dope. The web is firsrt saturated with the cross-linking agent and/or curing catalyst, dried at ambient temperatures to avoid premature cross-linking, and then saturated with the hot, high solids containing dope. The material is subsequently dried to evaporate excess water and cured to form a continuous cross-linked fibrous food wrapping having high web strength, which remains substantially free of embrittlement. Drying and curing may be conducted sequentially or performed substantially simultaneously. The fibers of the cross linker laden reinforcement which are in intimate contact with the dope operate to meter the cross-linking agent into the hot dope prior to the drying and curing phase and eliminates the problem of premature gelling of the dope.

This method may also be conducted by an ion exchange mechanism whereby a polymeric acid or other acid bonded to the web, like malic acid is released upon application of a dope which also contains a salt, such as sodium chloride or calcium chloride. The salt in the dope is capable of undergoing ion exchange with the bound acid present in and on the fibers of the reinforcement. When such dope is applied, the acid is released by ion exchange into the dope matrix and is available for catalysis of cross-linking of the amylomaceous material. This alternative also avoids the instability problem, permits a wider choice of activities for the cross-linker, and higher dope solids content than with batch makeup. As with the previous embodiment, both the cross-linker and acid catalyst can be carried in the uncured state by the web reinforcement and the dope applied to the web which is dried and cured.

As an alternative, dope instability can be avoided during casing manufacturing by incorporating the cross-linking agent into the hot dope before application to the web, but without the curing catalyst. In addition, the catalyst may be applied to the web after saturating with the dope by a separate step, but more preferably is applied to the reinforcement before the dope. In the later case, the catalyst provides better uniformity in cross-linking density throughout the web.

The foregoing methods are applicable either to a casing made as a cylindrical tube simultaneously with saturation with the dope which is used as a seaming agent, or casing material made as a flat web and then slit and seamed into a casing as a second operation. For example, a high amylose starch dope, like amylomaize can be applied to a lap seam margin where the seam had been previously coated with a mixture of a cross-linking agent and organic acid catalyst. This lap seam is then cured to crosslink the starch rendering it resistant to wetting while providing sufficient shear strength to resist the stress of stuffing. The cross-linked amylomaize seam does not resist smoke penetration, so that when the sausage product is stuffed, cooked, and smoked, the color of the sausage is uniform around the entire periphery. Especially useful smokes for use with the amylose casings of the present invention are the alkaline liquid smokes described in U.S. Pat. Nos. 4,442,868 and 4,446,167.

Suitable cross-linking agents may be selected from known food acceptable grade materials, such as aldehyde polymers, e.g. melamine-formaldehyde oligomers, etc. They are commercially available under such trademarks as Accobond from American Cyanamide. Accobond 3524 is a highly methylolated melamineformaldehyde pre-condensate. Other suitable materials include, but are not limited to, glutaraldehyde, formaldehyde and the water soluble epoxy-substituted polysecondary amine thermosetting resins. Generally, they are condensates of epichlorohydrin and a polyamide. That is, oligomers or polymers having a plurality of secondary amine groups, e.g. polyamide amines, polyurea amines, and the like. They are available under a registered trademark of Hercules, Inc., Kymene, e.g. grade 557. Such products are also known as Hercules Resin 2000 which is water soluble thermosetting epoxy substituted polymer marketed by Hercules, Inc., which is the reaction product of epichlorohydrin and an adipic acid-diethylene triamine polyamide.

Generally, the cross-linkers are applied at a range of 1 to about 20 percent based on casing weight. Low equivalent weight (30–60) cross-linkers like formaldehyde and glutaraldehyde may be applied at 1 to about 5 percent; intermediate equivalent weight (60–150) cross-linkers like melamine-formaldehyde can be applied at about 2 to about 10 percent and the high equivalent weight (above 150) materials like condensates of epichlorohydrin and polysecondary amines may be applied at a range of about 5 to about 20 percent based on weight of casing.

The choice of curing catalyst should be based on practical considerations, like curing rate including embrittlement which may be associated with acid attack on the cellulose fibers and other reinforcing fibers, as well as on the amylose starch matrix. In the case of amylose or high amylose starch, only modest pH's, acid or alkaline, should be utilized because of the potential for depolymerization by high concentrations of moderately strong-hot acids. Many food-approved acids can be used as curing catalysts, including malic, citric, acetic acids, and other preferably nonvolatile food approved acids. The acids may be generally employed in concentrations ranging typically from about 10 to about 40 percent based on weight of resin solids in the cross-linker. Malic acid, for instance, can be used at 20 to 30 percent based on melamine-formaldehyde solids. With some cross-linkers like Kymene, alkaline catalysts are used.

The cross-linking mechanism involves the polymer matrix. However, as previously indicated, the fibers of the reinforcement may also be cross-linked, particularly if the reinforcement is a natural fiber, such as wood fiber, hemp fiber, cotton fiber, and the like. In those instances, the cross-linker can deleteriously embrittle the fibers so their elongation at break is too low to perform satisfactorily as a casing reinforcement. The epichlorohydrin-polyamide condensates previously discussed have the advantage of not cross-linking the fiber to a major extent, and therefore, the potential for embrittlement is thereby naturally lessened. Accordingly, it has been observed that embrittlement can be better controlled when cross-linking is limited to the matrix and the fibers at the matrix-fiber interface. That is, the cross-linking agent is preferably of sufficiently large molecular size that it cannot appreciably cross-link the interior of the reinforcing fibers.

The aqueous polymeric dopes of the present invention may also have incorporated various plasticizers for use with amylose and amylose starches, including glycerin, polyvinyl alcohol and other polymeric types like dextrins and polypeptide oligomers, such as those available under the name Sol-U-Pro, a trademark of Wilson and Company. The plasticizer, when used can be incorporated into the dope prior to saturation into the reinforcement. By applying the plasticizer with the dope, the need for extra processing baths can thereby be avoided.

It will be appreciated that depending upon the nature of the cross-linker and concentration of curing catalyst used for the amylose-high amylose-content starch, a cure step will be performed after the web has been dried. As previously indicated, the curing step may be incorporated in line with the drying step as a unitary operation or it may be performed sequentially as a separate step. Typically, for melamine-formaldehyde resins with a dope pH of about 4 derived from malic acid, curing can be completed in three minutes at about 130° to about 145° C.

Although the food wrappings and casings of the present invention are preferably prepared with high solid containing aqueous dopes of amylose and high amylose-content starches applied to reinforcing webs and cross-linked according to methods described hereinabove, it is to be understood that the non-edible fibrous wrappings of this invention may, although less preferred, still be prepared by dissolving high amylose-containing amylomaceous materials at high solids content in dilute alkali and applied to reinforcing substrates, regenerated in coagulation baths, treated in acid and wash baths to make casing material analogous to the well-known viscose process. For example, 15 to 25 percent or more amylomaize dopes can be prepared in dilute (3 to 5 percent) aqueous caustic soda solution and applied by saturating a fibrous web and the alkali neutralized to coagulate and regenerate the amylose from its alkaline aqueous solution. Cross-linking agents carried by the reinforcement are catalyzed in either alkaline, neutral or subsequently adjusted acid conditions. Because it is usually necessary to pass the material coated with an alkaline dope through an aqueous bath, the cross-linker might be applied from such baths after the alkali has been largely removed.

The following specific examples demonstrate the subject matter of the instant invention, however, it is to be understood that they are for illustrative purposes only and do not purport to be wholly definitive as to conditions and scope.

EXAMPLE I

PART A

A weak, nonbonded, water-laid web of abaca fiber of 14 lb/2880 ft$^2$ basis weight was bonded with a dope prepared as follows: 71.6 grams of a spin casing viscose of 7.7 percent cellulose and 6.5 percent total alkali was diluted to 1 percent cellulose by 10° C. deionized water. Moist 20–50 mesh, Dow cation exchange resin 50WX8H (acid form) was added slowly with rapid stirring over a ten minute period until the solution had a pH of 8.7. The amber liquid was decanted and diluted to 0.25 percent cellulose as cellulose xanthate with cold water. The nonbonded web was then dip-drained into the dope to give a 3 percent cellulose load. Two 12″ by 12″ sheets of the web, Sheet A and Sheet B, were then air dried in a 25° C. air stream and heated at 100° C. for ten minutes to regenerate the cellulose to bond the web.

Sheet A was dip-drained in a cross-linker dope of 1.5 percent solids, American Cyanamide Accobond 3524 melamine-formaldehyde pre-condensate and 0.3 percent malic acid catalyst and dried at 25° C. to avoid extensive cure. Bonded Sheet B was dip-drained in a 0.5 percent solids melamine-formaldehyde solution containing 0.1 percent malic acid and also air-dried.

A 10 percent amylomaize VII comprising 70 percent amylose and 30 percent amylopectin was used to prepare a dope with 3.5 percent glycerol. The amylomaize was slurried into hot water at a temperature of 95° C. The glycerin was added under high shear mixing. The hot slurry at about 75° C. was then poured into a 400 ml glass pressure bottle and placed in a hot glycerin bath initially at about 110° C. The dispersion became translucent as the temperature of the bath was raised from 115° C. to about 145°–148° C. The dope became visually homogenous in less than an hour. The dope was cooled to 95° C. and cast over 30 mil drawdown on a glass plate heated at 70° C. and Sheet A laid down and the dope allowed to saturate for 60 seconds. It was dried to touch at 130° C. in a hot air oven and then cured at 140° C. for six minutes to cross-link for wet strength. Sheet B was prepared with the amylomaize VII dope in a similar manner.

Instron Tensile analysis was used to test for tensile properties. Table 1 below demonstrates the properties of the films conditioned at 80 percent relative humidity where they were first allowed to reach equilibrium at 25° C. Wet strength of the films was also determined after being soaked in water.

TABLE 1

| TENSILE STRENGTH (BREAK-psi) | BREAK ELONGATION (%) | TOTAL STRENGTH (BREAK FORCE lbs/in.) | BREAK ENERGY (vol. inch-lb/in$^3$) | STIFFNESS MAX. MODULUS (psi/100%) |
|---|---|---|---|---|
| | | 80% RH CONDITIONED | | |

TABLE 1-continued

|  | TENSILE STRENGTH (BREAK-psi) | BREAK ELONGATION (%) | TOTAL STRENGTH (BREAK FORCE lbs/in.) | BREAK ENERGY (vol. inch-lb/in³) | STIFFNESS MAX. MODULUS (psi/100%) |
| --- | --- | --- | --- | --- | --- |
| Film A | 4134 | 8.9 | 19.0 | 162 | 52,400 |
| Film B | 4600 | 9.0 | 17.8 | 166 | 48,400 |
| REWET | | | | | |
| Film A | 2502 | 9.8 | 11.8 | 170 | 37,400 |
| Film B | 1685 | 8.5 | 7.6 | 104 | 34,600 |

PART B

In order to determine the effect of lower glycerin content on the physical properties of the film a 10 percent amylomaize VII dope was prepared with 15 percent glycerol based on weight of polymer solids instead of 35 percent used in the procedure of Part A. A 12½ lb/2880 ft² Abaca web used for cellulose casings was treated with cross-linker dope containing 1.5 percent solids of Accobond 3524 resin and 0.3 percent malic acid. The dope was cast over 22 mil drawdown on a 70° C. glass plate and the sheet allowed to saturate for 60 seconds. The coated substrate was dried at 130° C. and cured for six minutes at 145° C. to cross-link.

Table 2 provides the tensile analysis both in conditioned and when rewet.

TABLE 2

| DIRECTION | TENSILE STRENGTH (BREAK-psi) | BREAK ELONGATION (%) | TOTAL STRENGTH (BREAK FORCE lbs/in) | BREAK ENERGY (vol. inch-lb/in³) | STIFFNESS MAX. MODULUS (psi/100%) |
| --- | --- | --- | --- | --- | --- |
| 80% RH CONDITIONED | | | | | |
| L | 4452 | 6.9 | 14.4 | 149 | 75,150 |
| T | 4078 | 9.22 | 13.2 | 176 | 52,400 |
| REWET | | | | | |
| L | 2855 | 8.9 | 9.95 | 168 | 52,650 |
| T | 2429 | 10.15 | 8.38 | 169 | 32,100 |

Tensile analyses of the fibrous reinforced, high amylose starch, cross-linked films in Tables 1 and 2 not only had good strength for handling prior to use, but the films also possessed wet strengths and elongation properties well within the acceptable range for stuffing with meat products. The films also remained flexible as indicated by the low maximum moduli.

EXAMPLE II

In order to demonstrate the relationship between cross-linking and wet strength of reinforced amylose films a further experiment was performed. Using the methods outlined in Example I a 10 percent by weight amylomaize VII dope was prepared containing 1.0 percent glycerol. When the dope was cooled it was cast over 22 mil drawdown on a heated glass plate and a commercially bonded 15 pound Abaca hemp web having no cross-linker laid down and allowed to become saturated. The film was conditioned at 80 percent RH and allowed to reach equilibrium at 25° C. and tested using Instron Tensile analysis. The film was dried at about 110° C. and then cured at 145° C. for 3 minutes and then rewet. The analysis of the film conditioned at 80 percent RH and rewet are provided in Table 3 below.

TABLE 3

| DIRECTION | TENSILE STRENGTH (BREAK-psi) | BREAK ELONGATION (%) | TOTAL STRENGTH (BREAK FORCE lbs/in) | BREAK ENERGY (vol. inch-lb/in³) | STIFFNESS MAX. MODULUS (psi/100%) |
| --- | --- | --- | --- | --- | --- |
| 80% RH CONDITIONED | | | | | |
| LONGITUDINAL | 4037 | 10.3 | 16.7 | 179 | 41,500 |
| REWET | | | | | |
| LONGITUDINAL | 232 | 6.0 | 1.0 | 24.5 | 19,700 |

Instron Tensile analysis shows the conditioned strength of the non-cross-linked film to be satisfactory. However, the wet-strength of the non-cross-linked reinforced film was well below the minimum acceptable level.

EXAMPLE III

PART A

American Maize Products Company, Amizo amylomaize VII starch was used as the 70 percent amylose starch matrix. 156.45 grams (10.52 percent moisture) of the amylomaize VII and 49 grams of glycerol in a beaker were dispersed by a Heller Mixer with boiling water for one minute to give 1400 grams of hot slurry. The slurry was poured into a stainless steel pressure vessel, held in a glycerol bath at a 140° C. After a few minutes the bath temperature was lowered to 130° C. as the contents of the vessel became heated. The starch dissolved over a one hour period. The cannister was then placed in a 90° C. oven overnight. The dope contained 10 percent starch solids and 3.5 percent glycerol. The dope was pressurized with 30 psi nitrogen to feed through a filter for plate casting.

PART B

A 12¼ lb/2880 ft² hemp commercial saturation web bonded by 1 to 3 percent regenerated cellulose as wet strength agent was used for the reinforcements. An uncured cross-linking agent was loaded into the web by dipping the web into a 25° C. freshly made solution containing 1.5 percent solids American Cyanamide Accobond 3524 in 0.3 percent aqueous d,l-malic acid and the web allowed to drain. It was air-dried in a 25° C. air stream for one hour until dry to touch.

The amylomaize dope prepared above in Part A was extruded through a filter onto a lecithin-oil coated 18 inch by 48 inch glass plate heated to 70° C. The temperature of the dope was 90° C. A 13 inch wide stainless steel drawbar at a temperature of 90° C. was used to draw down a 22 mil layer of the dope on the heated plate and the melamine-formaldehyde laden paper rolled onto the limpid liquid and saturation allowed to take place for 60 seconds to complete saturation of the web. The plate was removed from the heating tapes and plate and film (gelled) taken to a high velocity Despatch oven to dry at 70° C. for 12 minutes until it was just dry to touch. The hand cast film was then removed from the release coated plate and cured at 145° C. for six minutes to bring about cross-linking of the amylomaize by the melamine-formaldehyde cross-linking agent. The sheet was then humidified for 48 hours at 80 percent RH to soften the sheet and then flattened before seaming into 4 foot casing lengths. Aluminum plate masks were used to cut several sheets of the reinforced films into widths of 5-14/16 inches, 7⅛ inches and 9½ inches which when lapped for 0.5 inch seam would provide trade sizes 1, 2, and 4 casings.

PART C

The seam area for sausage casings should be permeable to smoke or water vapor similar to the rest of the casing circumference in order for the seam adhesive to be useful for casings. A jig was made for accurate 0.5 inch lapping. One edge of the rectangular 46 inch piece was painted by brush with a fresh solution of 6 percent solids Accobond 3524 containing 2 percent malic acid. The opposite face of the lap was generously painted with the hot 10 percent amylomaize VII dope and the two lapped and heated at 100° C. heating under contact pressure for 15 minutes. The resulting seam when wet-out in water and sample cut to 0.5 inch test strips perpendicular to the seam showed tensile shear break away from the seam. A similar-behaving seam was made using Airco Vinol 165 polyvinyl alcohol solution of 11 percent concentration and similar technique of seaming.

PART D

The size 2 and 4 casings were stuffed with a normal beef-pork bologna emulsion. The 4 foot length casings were double clipped at one end and stuffed using a Handtmann Vemag Stuffer. The pieces were tied with a hanger and cooked in a Julian pilot sized smoke house using wood chips for smoke. Controls of reinforced regenerated cellulose commercial "Fibrous" casings of the same sizes were also cooked and smoked.

Cooking was carried out to 154° F. internal temperature and the sausages sprayed by cold water and examined after cooling to 45° F. internal temperature. The amylomaize VII and Fibrous encased sausages showed normal 8 percent weight losses. Amylomaize VII and Fibrous encased sausages had the same smoke color including the area under the seam. Amylomaize VII and Fibrous encased sausages showed a good smooth appearance with the casing clinging tightly to the meat. Peeling ease for test and control was similar.

A normal pepperoni emulsion was chosen for the dry sausage. Size 1 and 2 casings were used to be sizes similar to normal use and Fibrous controls used. A high humidity modern high speed drying was used after the first 24 hour emulsion cure at 95° F. The amylomaize VII encased sausage and Fibrous controls lost weight to a target 21-22 percent loss at similar rates. No smoke was used, but the pepperoni in the amylomaize VII and control were similar in color. No undesired casing separation from the sausage took place.

While the invention has been described in conjunction with specific examples thereof, this is illustrative only. Accordingly, many alternatives, modifications and variations will be apparent to persons skilled in the art in light of the foregoing description, and it is therefore intended to embrace all such alternatives, modifications and variations as to fall within the spirit and broad scope of the appended claims.

What is claimed is:

1. A high wet strength food wrapping which comprises a fibrous reinforcement impregnated with a continuous cross-linked matrix comprising a high amylose-containing amylomaceous material, said food wrapping remaining substantially flexible with aging.

2. The reinforced food wrapping of claim 1 wherein the wet strength of the impregnated reinforcement is sufficient to resist a break force of not less than 1200 psi.

3. The reinforced food wrapping of claim 2 wherein the wet strength of the impregnated reinforcement is sufficient to resist a break force from about 2000 to about 4000 psi.

4. The reinforced food wrapping of claim 2 wherein the matrix is a material selected from substantially pure amylose, a high amylose starch comprising at least about 45 percent amylose and mixtures thereof.

5. The reinforced food wrapping of claim 4 wherein the fibrous reinforcement is saturated with an amylomaize starch comprising at least about 60 percent amylose.

6. A food casing comprising a fibrous reinforcement saturated with cross-linked matrix of a high amylose-containing amylomaceous material, the cross-linking being of sufficient density to impart high wet strength to the casing while minimizing embrittlement thereof.

7. The food casing of claim 6 wherein the amylomaceous material is selected from substantially pure amylose, a high amylose starch comprising at least 45 percent amylose and mixtures thereof.

8. The food casing of claim 7 wherein the reinforcement is a web formed from a fibrous material selected from the group consisting of wood, hemp, cotton, nylon, rayon, polyesters, polyolefins and mixtures thereof.

9. The food casing of claim 7 wherein the fibrous reinforcement is a bonded cellulosic web.

10. A method for making high wet strength food casings, which comprises the steps of:
 a. providing a fibrous reinforcement with a substantially continuous matrix by impregnating the reinforcement with a dope comprising a high amylose-containing amylomaceous material, and
 b. curing the impregnated reinforcement by cross-linking sufficiently to increase its wet strength while minimizing embrittlement thereof.

11. The method of claim 10, including the step of contacting the fibrous reinforcement with a cross-linking agent prior to impregnation with the dope.

12. The method of claim 11, including the addition of an agent into the dope or reinforcement to catalyze cross-linking.

13. The method of claim 12 wherein the amylomaceous material is selected from the group consisting of substantially pure amylose, a high amylose starch comprising at least about 45 percent amylose and mixtures thereof.

14. The method of claim 13 wherein the dope includes a plasticizer.

15. The method of claim 13 wherein the cross-linking agent is a melamine-formaldehyde pre-condensate.

16. The method of claim 13 wherein the cross-linking agent is glutaraldehyde, formaldehyde or an epichlorohydrin-polyamide condensate.

17. The method of claim 10, including the step of incorporating a cross-linking agent into the dope.

18. The method of claim 17, including the step of applying an agent to the reinforcement prior to impregnation with the dope to catalyze cross-linking.

19. The method of claim 11, including the step of incorporating an agent into the dope for catalyzing cross-linking.

20. The method of claim 18 wherein the amylomaceous material is selected from the group consisting of substantially pure amylose, a high amylose starch comprising at least about 45 percent amylose and mixtures thereof.

21. A method for making a high wet strength food wrapping, which comprises the steps of:
   a. saturating a fibrous reinforcement with a dope to form a film with a continuous matrix, said dope comprising a high amylose-containing amylomaceous material, the film including a cross-linking agent and an agent for catalyzing cross-linking, and
   b. curing the film by cross-linking at sufficient density to maximize wet strength while minimizing embrittlement thereof.

22. The method of claim 21 including the step of incorporating the cross-linking agent and an agent for catalyzing cross-linking into the fibrous reinforcement prior to saturation.

23. The method of claim 21 wherein the molecular size of the cross-linking agent is sufficient to minimize cross-linking of the interior fibers of the web.

24. The method of claim 21, including the step of incorporating the cross-linking agent into the dope and the agent for catalyzing cross-linking is applied to the reinforcement.

25. The method of claim 22 wherein the dope includes a plasticizer.

26. The method of claim 21, including the step of drying the film prior to curing.

27. The method of claim 21 wherein the film is dried during the curing step.

28. The method of claim 21, including the step of forming the film into a tubular casing.

29. The food casing of claim 6 shirred into a tubular strand.

30. The food casing of claim 6 provided as reelstock for continuous stuffing.

31. The food casing of claim 8 shirred into a tubular strand.

32. The food casing of claim 9 shirred into a tubular strand.

33. A shirred strand of food casing formed from the tubular material made according to the method of claim 28.

34. A food product packaged in the wrapping of claim 1.

35. A meat product packaged in the food wrapping of claim 5.

36. A sausage product packaged in the casing of claim 6.

37. A sausage product packaged in the casing of claim 8.

38. A ready-to-stuff food casing having sufficient moisture for stuffing when manufactured that further moisture need not be added prior to stuffing, which comprises a fibrous reinforcement saturated with a cross-linked matrix of a high amylose-containing amylomaceous material, the cross-linking being of sufficient density to impart high wet strength to the casing while minimizing embrittlement thereof.

39. The ready-to-stuff casing of claim 38 wherein the amylomaceous material is selected from substantially pure amylose, a high amylose starch comprising at least 45 percent amylose and mixtures thereof.

40. The ready-to-stuff casing of claim 38 wherein the amylomaceous material is amylomaize.

* * * * *